US010539014B2

(12) United States Patent
Han et al.

(10) Patent No.: US 10,539,014 B2
(45) Date of Patent: Jan. 21, 2020

(54) DETERMINING A MUDWEIGHT OF DRILLING FLUIDS FOR DRILLING THROUGH NATURALLY FRACTURED FORMATIONS

(71) Applicant: Saudi Arabian Oil Company, Dhahran (SA)

(72) Inventors: Yanhui Han, Katy, TX (US); Younane N. Abousleiman, Norman, OK (US); Chao Liu, Houston, TX (US); Shawn Rimassa, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/287,547

(22) Filed: Feb. 27, 2019

(65) Prior Publication Data

US 2019/0264559 A1 Aug. 29, 2019

Related U.S. Application Data

(60) Provisional application No. 62/636,004, filed on Feb. 27, 2018.

(51) Int. Cl.
*G01V 1/40* (2006.01)
*E21B 49/00* (2006.01)
(Continued)

(52) U.S. Cl.
CPC ............ *E21B 49/003* (2013.01); *E21B 21/08* (2013.01); *E21B 44/00* (2013.01); *E21B 49/006* (2013.01);
(Continued)

(58) Field of Classification Search
None
See application file for complete search history.

(56) References Cited

U.S. PATENT DOCUMENTS 6,832,158 B2 * 12/2004 Mese ...................... E21B 21/08
702/13
2003/0212465 A1 11/2003 Howard et al.
(Continued)

FOREIGN PATENT DOCUMENTS

WO 01/94749 12/2001
WO 2017035371 3/2017

OTHER PUBLICATIONS

International Search Report and Written Opinion issued in International Application No. PCT/US2019/017936 dated Jun. 13, 2019, 13 pages.
(Continued)

*Primary Examiner* — Aditya S Bhat
(74) *Attorney, Agent, or Firm* — Fish & Richardson P.C.

(57) ABSTRACT

The present disclosure describes methods and systems, including computer-implemented methods, computer program products, and computer systems, for determining a mudweight of drilling fluids in a hydrocarbon reservoir. One computer-implemented method includes: receiving pore pressure data of a rock formation in the hydrocarbon reservoir; determining permeability data of fractures of the hydrocarbon reservoir; determining Hoek-Brown failure criterion data; and determining a safe mudweight window based on the pore pressure data of the rock formation, the permeability data of the fractures, and the Hoek-Brown failure criterion data.

20 Claims, 8 Drawing Sheets

(51) Int. Cl.

| | | |
|---|---|---|
| *E21B 21/08* | (2006.01) | |
| *G06F 17/50* | (2006.01) | |
| *G01V 1/34* | (2006.01) | |
| *G01V 1/28* | (2006.01) | |
| *E21B 44/00* | (2006.01) | |
| *G01V 1/30* | (2006.01) | |

(52) U.S. Cl.
CPC .............. *G01V 1/282* (2013.01); *G01V 1/306* (2013.01); *G01V 1/34* (2013.01); *G06F 17/5009* (2013.01); *G01V 2210/6242* (2013.01); *G01V 2210/6244* (2013.01); *G01V 2210/6246* (2013.01); *G01V 2210/6248* (2013.01); *G01V 2210/663* (2013.01); *G06F 2217/16* (2013.01)

(56) References Cited

U.S. PATENT DOCUMENTS

| | | |
|---|---|---|
| 2010/0121623 A1 | 5/2010 | Yogeswaren |
| 2013/0275099 A1 | 10/2013 | Frydman |
| 2015/0055438 A1 | 2/2015 | Yan et al. |

OTHER PUBLICATIONS

Abousleiman and Nguyen, "Poromechanics Response of Inclined Wellbore Geometry in Fractured Porous Media," Journal of Engineering Mechanics, ASCE, Nov. 2005, 14 pages.

Ahmed et al. "7.2.2 Information Required to Move to a Pilot Project," Unconventional Resources Exploitation and Development, 2016, 1 page.

Barenblatt et al., "Basic Concepts in the Theory of Seepage of Homogeneous Liquids in Fissured Rocks (Strata)," PMM vol. 24, No. 5, 1960, 18 pages.

Biot, "General Theory of Three-Dimensional Consolidation," The Ernest Kempton Adams Fund for Physical Research of Columbia University, reprinted from Journal of Applied Physics, vol. 12, No. 2, Feb. 1941, 11 pages.

Cui et al., "Poroelastic Solution for an Inclined Borehole," Transactions of the ASME, vol. 64, Mar. 1997, 7 pages.

Detournay and Cheng, "Poroelastic Response of a Borehole in a Non-Hydrostatic Stress Field," International Jounral of Rock Mechanics, Min. Science and Geomech. Abstracts, vol. 25, No. 3, 1988, 12 pages.

Fjaer et al. "Stresses around Boreholes. Borehole Failure Criteria," 2008, 1 page.

Hoek and Brown, "Empirical Strength Criterion for Rock Masses," Journal of the Geotechnical Engineering Division, Sep. 1980, 20 pages.

Liu et al., "Safe Drilling in Chemically Active and Naturally Fracured Source Rocks: Analytical Solution and Case Study," Society of Petroleum Engineers/IADC, IADC/SPE Drilling Conference and Exhibition, Fort Worth Texas, Mar. 6-8, 2018.

Lyngra et al. "Heavy Oil Characterization: Lessons Learned During Placement of a Horizontal Injector at a Tar/Oil Interface," SPE-172673-MS, Society of Petroleum Engineers, presented at the SPE Middle East Oil & Gas Show and Conference, Bahrain, Mar. 8-11, 2015, 20 pages.

Ottesen, "Wellbore Stability in Fractured Rock," IADC/SPE 128728, Society of Petroleum Engineers, presented at the 2010 IADC/SPE Drilling Conference and Exhibition, Louisana, Feb. 2-4, 2010, 8 pages.

Wilson and Aifantis, "On the Theory of Consolidation with Double Porosity," International Journal of Engineering Science, vol. 20, No. 9, 1982, 27 pages.

\* cited by examiner

DETERMINING A MUDWEIGHT OF DRILLING FLUIDS FOR DRILLING THROUGH NATURALLY FRACTURED FORMATIONS

CROSS REFERENCE TO RELATED APPLICATIONS

This application claims the benefit of priority of U.S. Application Ser. No. 62/636,004, filed on Feb. 27, 2018, which is incorporated by reference herein in its entirety.

TECHNICAL FIELD

This disclosure relates to exploration and production of hydrocarbon products and, more specifically, to determining a mudweight of drilling fluids.

BACKGROUND

In the context of hydrocarbon production operations, wellbore instability is an important issue. Wellbore instability may cause problems such as fluid lost circulation, wellbore collapse, wellbore enlargement, tight holes, and washouts.

SUMMARY

The present disclosure describes methods and systems, including computer-implemented methods, computer program products, and computer systems for determining a mudweight of drilling fluids in a hydrocarbon reservoir. One computer-implemented method includes receiving, by a hardware processor, pore pressure data of a rock formation in the hydrocarbon reservoir; determining, by the hardware processor, permeability data of fractures of the hydrocarbon reservoir; determining, by the hardware processor, Hoek-Brown failure criterion data; and determining, by the hardware processor, a safe mudweight window based on the pore pressure data of the rock formation, the permeability data of the fractures, and the Hoek-Brown failure criterion data.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that, in operation, cause the system to perform the actions. One or more computer programs can be configured to perform particular operations or actions by virtue of including instructions that, when executed by data processing apparatus, cause the apparatus to perform the actions.

The details of one or more implementations of the subject matter of this specification are set forth in the accompanying drawings and the subsequent description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
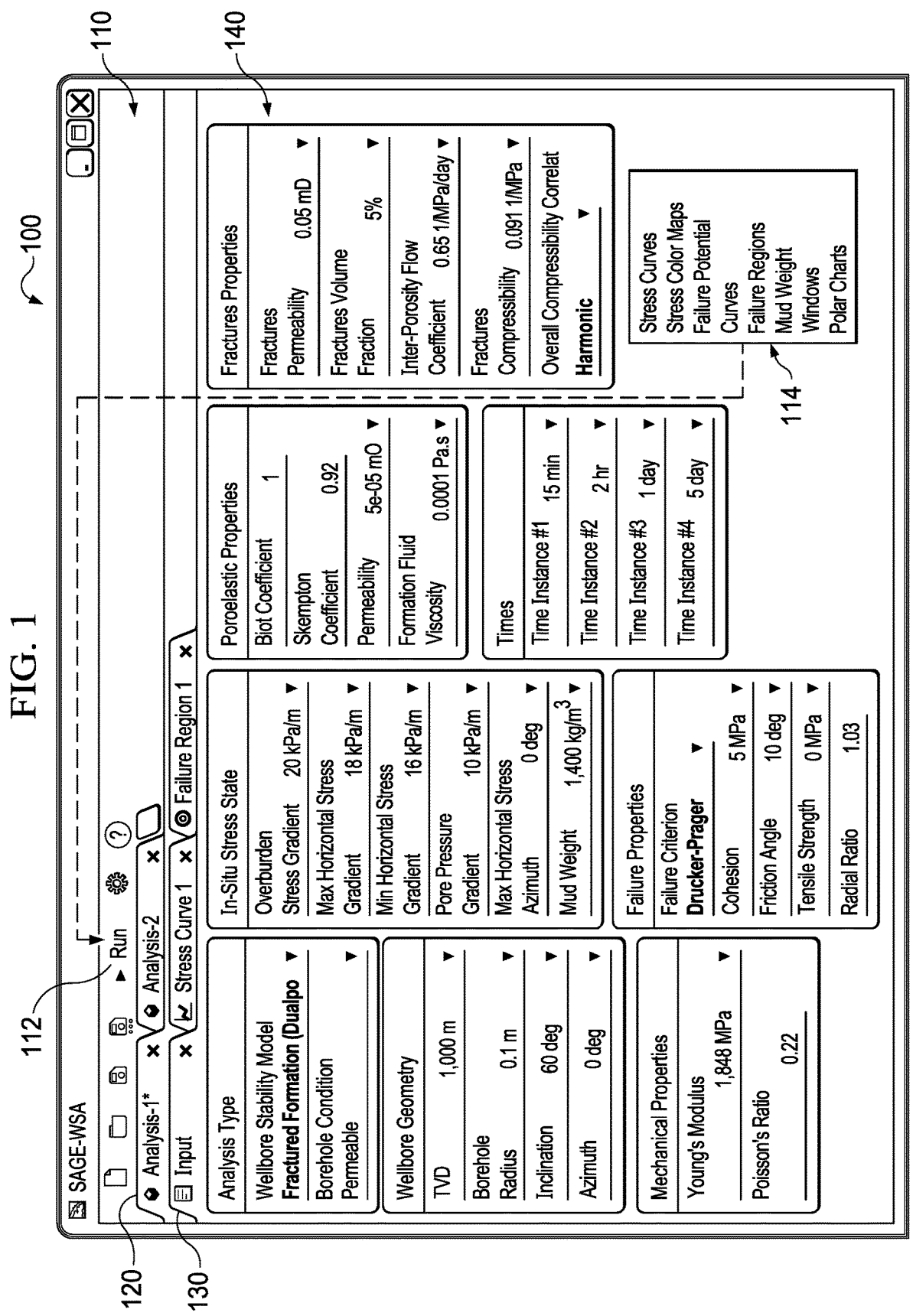
FIG. 1 illustrates an example of a graphical user interface (GUI) for the wellbore stability tool, accordingly to an implementation.

The following description is presented to enable any person skilled in the art to make and use the disclosed subject matter, and is provided in the context of one or more particular implementations. Various modifications to the disclosed implementations will be readily apparent to those skilled in the art, and the general principles defined in this disclosure may be applied to other implementations and applications without departing from scope of the disclosure. Thus, the present disclosure is not intended to be limited to the described or illustrated implementations, but is to be accorded the widest scope consistent with the principles and features disclosed in this disclosure.

This disclosure generally describes methods and systems, including computer-implemented methods, computer program products, and computer systems, for supporting drilling through naturally fractured formations. The stability of drilled wellbore can be affected by in-situ stresses and pore pressure, mechanical properties of the drilled formation, the trajectory of well to be drilled, and the selected drilling mud. The presence of natural fractures may impact the wellbore stability. For example, the presences of natural fractures can modify the stresses and pore pressure distributions around the wellbore. The presences of natural fractures can also modify the mechanical and hydraulic properties of the source rock. Both rock matrix and natural fractures are in contact with drilling mud in the wellbore, the pressure difference between wellbore and reservoir may induce fluid diffusion. Due to the greater conductivity, the fluid pressure may diffuse faster in natural fractures than in rock matrix. In addition to the primary diffusion between the wellbore and the natural fractures and the secondary diffusion between the wellbore and the rock matrix, the pressure difference between the rock matrix and the natural fractures may cause tertiary fluid diffusion between the natural fractures and rock matrix. Subsequently, the effective stresses may evolve with the pore pressures in the natural fractures and the rock matrix. Therefore, the presence of natural fractures introduces additional coupling processes around the wellbore and makes the stability of the wellbore a time-dependent problem. Furthermore, the existence of micro-fractures may impact the strength (for example, loading capacity) of the formations, which may also factor in the wellbore stability evaluation. Therefore, the operations of hydrocarbon production, for example, oil and gas productions from offshore, unconventional reservoirs, and the identification, quantification and assessment of natural fractures are important aspects in the drilling operations.

In some cases, shales may be chemically active. Shale strength and other mechanical properties and behaviors may be altered when exposed to aqueous solutions. The electrically charged clay in shale can cause shrinking or swelling when exposed to aqueous solutions because of the exchange of ions and water with the circulation fluids. These flows are driven by gradients of hydraulic, chemical, and electrical potentials. When drilling through such chemically active shale formations, the differences of hydraulic pressure and salinity between the drilling mud and native formation fluids may cause the exchange of water and ions between them. Furthermore, excess pore pressure may be generated around the wellbore wall due to the Donnan's effect. As a result, tensile radial stress may develop around the wellbore, leading to wellbore spalling.

For wellbores located in naturally fractured rock formations, individual analytical solutions (for example, dual-poroelastic solutions for vertical wellbore, dual-poroelastic solution for inclined wellbore, and dual-porochemoelastic solution for inclined wellbore) may be used to analyze the wellbore stabilities. However, these solutions may not be able to account for the combined effects of natural fractures and chemical and electrokinetical activity in shale formations.

In some implementations, software tools can be implemented to analyze the wellbore stabilities using a dual-porosity dual-permeability porochemoelectroelastic approach. The dual-porosity dual-permeability porochemoelectroelastic approach takes into considerations the porosity and permeability of both the rock matrix and natural fractures, as well as the Hoek-Brown failure criterion to compute safe mudweight windows for drilling naturally fractured reservoirs. The software tool can be integrated into a drilling geomechanics, workflow software package, or implemented as a stand-alone wellbore stability analyzer.

FIG. 1 illustrates an example of a graphical user interface (GUI) 100 for the wellbore stability tool, accordingly to an implementation. The GUI 100 includes an operational bar 110. The operational bar 110 includes one or more operational icons, including for example the "Run" icon 112. Each of the operational icon represents a wellbore stability analysis function. Examples of the wellbore stability analysis functions includes "New Analysis", "Open", "Save", "Save As . . . ", "Run", "Settings," and "Help." Each icon, if clicked or otherwise selected, can trigger the wellbore stability tool to execute the corresponding wellbore stability analysis functions. In one example, a pull down menu 114 can be displayed if the "Run" icon 112 is selected. The pull down menu 114 can include a list of tasks such as "Stress Curves," "Stress Color Maps," "Failure Potential Curves," "Failure Regions," "Mud Weight Windows," and "Polar Charts." If one of the tasks is selected, the wellbore stability tool can perform the calculations corresponding to the selected task.

The GUI 100 includes the case bar 120. The case bar 120 includes one or more tabs, each representing a case that is under analysis. In the illustrated example, two cases "Analysis-1" and "Analysis-2" are displayed, while the tab representing the first case "Analysis-1" is selected. The GUI 100 also includes the model panel bar 130. The model panel bar 130 includes one or more subtabs, each representing a model view panel. In the illustrated example, the "input" subtab is selected, and thus input panels are displayed. The GUI 100 also includes the model panel view area 140, which displays the model panels for the subtab that is selected. In the illustrated example, input information such "analysis type", "wellbore geometry", and other information are displayed. The wellbore stability tool can obtain the input information form data file or user inputs. In some cases, the user can change one or more parameters using the GUI 100.

Figure 2:
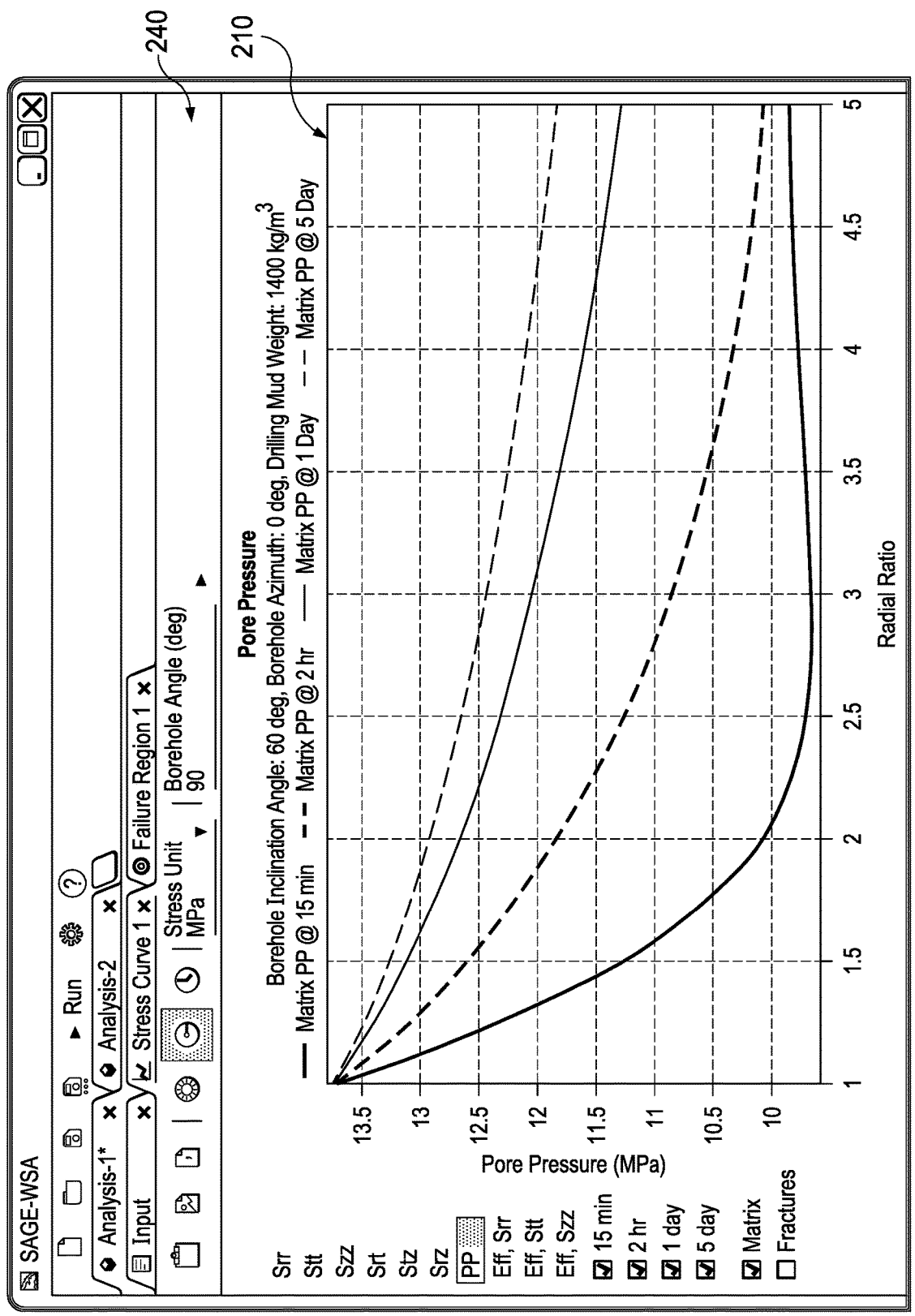
FIG. 2 illustrates a different example of a graphical user interface (GUI) for the wellbore stability tool, accordingly to an implementation.

In operation, if a user selected a task, for example, the "Stress Curves" task in the pull down menu 114, the wellbore stability tool can perform the stress curve calculations and generate a stress curve. The wellbore stability tool can also add a subtab representing "Stress Curves" on the model panel bar 130. If "Stress Curves" is clicked, the stress curve model panel is displayed. FIG. 2 illustrates a different example of a graphical user interface (GUI) 200 for the wellbore stability tool, accordingly to an implementation. The GUI 200 includes a pore pressure chart 210 that is displayed in the model panel view area 240. The pore pressure chart 210 includes different pore pressure curves computed by the wellbore stability tool.

Figure 3:
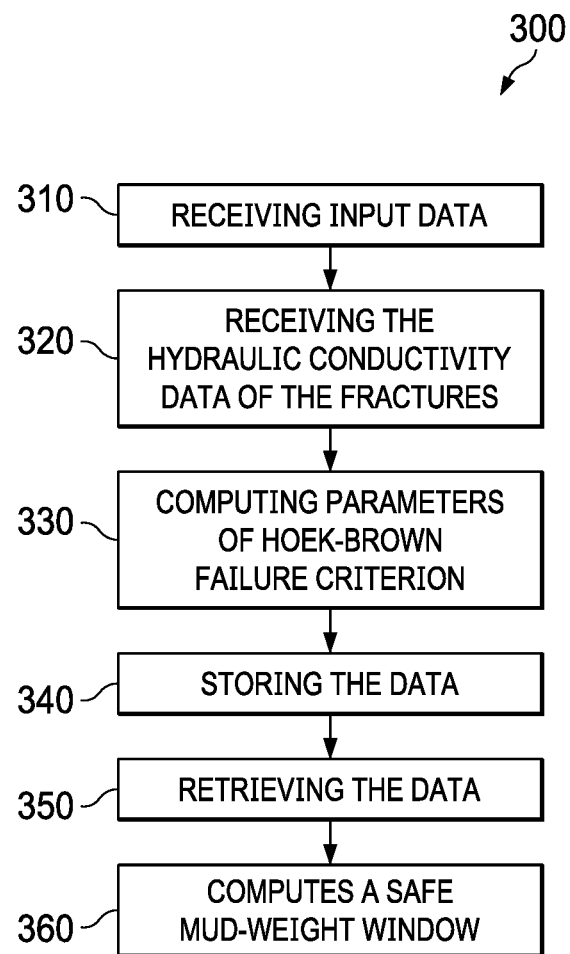
FIG. 3 illustrates an example of a method for wellbore stability analysis performed by the wellbore stability tool, according to an implementation.

FIG. 3 illustrates an example of a method 300 for wellbore stability analysis performed by the wellbore stability tool, according to an implementation. For clarity of presentation, the description that follows generally describes the method 300 in the context of FIGS. 1-2 and 3-10. However, it will be understood that method 300 may be performed, for example, by any other suitable system, environment, software, and hardware, or a combination of systems, environments, software, and hardware, as appropriate. In some implementations, various steps of method 300 can be run in parallel, in combination, in loops, or in any order.

At 310, the wellbore stability tool receives input data for wellbore stability analysis. The input data includes predrill well trajectory data, in-situ stress and pore pressure data, and elastic property data of formation rocks in the reservoir. In some cases, the input data can be received through one or more data files, transmissions over a network, user inputs, or any combinations thereof.

At 320, the wellbore stability tool receives the hydraulic conductivity data of the fractures. In some cases, the hydraulic conductivity data can be measured using one or more of following methods. If core samples from offset wells or similar formations can be collected, the permeability of fractures can be measured using a permeameter (for example a nano-permeameter). If drilling cuttings from offset wells or similar formations are available, a focused ion beam scanning electron microscope (FIB-SEM) scan can be performed and a digital rock can be constructed from the rock cuttings. Pore-scale simulations can be performed to measure the permeability of fractures. If drilling data from offset wells or similar formations are available, back-analysis can be performed on these data to compute permeability of fractures. In some cases, the wellbore stability tool can be used to perform the back-analysis. In some cases, these methods can be combined if more than input materials or data are available.

At 330, parameters of Hoek-Brown failure criterion can be computed based on the Geological Strength Index (GSI). The Hoek-Brown failure criterion is used to evaluate the shear failure of the naturally fractured Maastrichtian shale.

The details of the Hoek-Brown failure criteria will be explained in more detail in the later sections.

At 340, the mechanical and hydraulic properties of rock and fractures, including the input data received at 310 and the permeability data received at 320, are stored by the wellbore stability tool. In some cases, these data can be stored in a database.

At 350, the wellbore stability tool retrieves the stored data, including the predrill well trajectory data, the in-situ stress and pore pressure data, the elastic property data, and the permeability data.

At 360, the wellbore stability tool computes a safe mud-weight window based on the data and the Hoek-Brown failure criterion.

In some cases, the source rocks can be assumed to be linearly elastic materials before reaching plastic yielding stress domains. In the elastic domain, the mechanical behaviors of the rocks can be estimated by constitutive law, equilibrium equations and strain-displacement relation, as shown in the following equations:

$$\sigma'_{ij} = 2G\varepsilon_{ij} + \frac{2Gv}{1-2v}\varepsilon_{kk}\delta_{ij} \quad (1)$$

$$\sigma_{ij,j} = 0 \quad (2)$$

$$\varepsilon_{ij} = \frac{1}{2}(u_{i,j} + u_{j,i}) \quad (3)$$

In the above equations, the subscription i (=1,2,3) and j (=1,2,3) represents the directions of $x_i$ and $x_j$ in the Cartesian coordinates, respectively; $\sigma_{ij}$ is the total stress tensor; $\sigma_{ij,j}$ is the partial derivative of $\sigma_{ij}$ with respect to $x_j$; $\varepsilon_{ij}$ is the strain tensor; G is the shear modulus; v is Poisson's ratio; $u_i$ is the displacement vector; $u_{i,j}$ and $u_{j,i}$ are the partial derivatives of $u_i$ and $u_j$ with respect to $x_j$ and $x_i$, respectively; $\varepsilon_{kk}$ is the volumetric strain, where $\varepsilon_{kk}=\varepsilon_{11}+\varepsilon_{22}+\varepsilon_{33}$; $\delta_{ij}$ is the Kronecker delta; $\sigma'_{ij}$ is the effective stress tensor, where $$\sigma'_{ij}=\sigma_{ij}-\alpha p\delta_{ij} \quad (4)$$

where p is a constant pore pressure and α is Biot's coefficient of effective stress. In some cases, α can take a constant value of 1 because soil mass is much more compressible than individual soil solid grains.

Due to the pore pressure variation caused by fluid flow in the source rocks or rock deformation, the hydro-mechanical interaction can impose significant impact to the wellbore stability. Due the time-dependent nature of fluid diffusion in porous media, the stability of the wellbore becomes time-dependent. The pore pressure buildup and drop by mechanical contraction and expansion and the effective stress change induced by pore pressure variation can be captured in the following fluid transport equation and continuity equation:

$$q_i = -\frac{k}{\mu}\frac{\partial p}{\partial x_i} \quad (5)$$

$$\frac{\partial \varsigma}{\partial t} + \frac{\partial q_i}{\partial x_i} = 0 \quad (6)$$

and the following pore pressure—mechanical deformation coupling equation:

$$p=M(\varsigma-\alpha\varepsilon_{kk}) \quad (7)$$

where k is the intrinsic permeability of porous media; μ is the dynamic viscosity of pore fluid; ς is the volumetric variation of fluid content in the porous media; and $q_i$ is the pore fluid discharge vector. M is the Biot's modulus that can be calculated using the following equation:

$$M = \frac{2G(v_u - v)}{\alpha^2(1-2v_u)(1-2v)} \quad (8)$$

where $v_u$ is undrained Poisson's ratio and v is the drained Poisson's ratio. In some cases, $v_u$ can be calculated based on v, the Biot's coefficient α and the Skempton pore pressure coefficient B using the following equation:

$$B = \frac{3(v_u - v)}{\alpha(1-2v)(1+v_u)} \quad (9)$$

For the porous media that includes extensive micro-fractures, such as naturally fractured shales, the hydro-mechanical responses of the materials can be calculated based on dual-porosity and dual-permeability. The fractured porous media can be viewed as a superposition of two sets of porous materials: the matrix and the fractures. Each set of porous material has its own hydraulic conductivity. If the pore pressures in the matrix and the fractures are different, fluid transfer can take place between the matrix and the fractures. The following equations represent the fluid transport and continuity equations for the first porous medium 'I', the matrix:

$$q_i^I = -\frac{k^I}{\mu}\frac{\partial p^I}{\partial x_i} \quad (5a)$$

$$\frac{\partial \varsigma^I}{\partial t} + \frac{\partial q_i^I}{\partial x_i} = \Gamma(p^{II} - p^I) \quad (6a)$$

The following equations represent the fluid transport and continuity equations for the second porous medium 'II', the natural fractures:

$$q_i^{II} = -\frac{k^{II}}{\mu}\frac{\partial p^{II}}{\partial x_i} \quad (5b)$$

$$\frac{\partial \varsigma^{II}}{\partial t} + \frac{\partial q_i^{II}}{\partial x_i} = -\Gamma(p^{II} - p^I) \quad (6b)$$

where $k^I$ and $k^{II}$, $\varsigma^I$ and $\varsigma^{II}$, $q_i^I$ and $q_i^{II}$, $p^I$, and $p^{II}$ are the intrinsic permeability, the volumetric variation of fluid content, the pore fluid discharge vector, and fluid pressure of the matrix (I) and the natural fractures (II), respectively. Γ is the fluid transfer coefficient between the matrix and the natural fractures.

The compressibility of the fractured porous media is taken as the average of the matrix and the natural fractures:

$$\frac{1}{G} = \frac{1}{G^I} + \frac{1}{G^{II}}; \frac{1}{K} = \frac{1}{K^I} + \frac{1}{K^{II}} \quad (10)$$

where $K^I$ and $K^{II}$, $G^I$ and $G^{II}$ are bulk and shear moduli of the matrix and the natural fractures, respectively; G and K are the overall shear and bulk moduli of the fractured porous medium.

In some drilling geomechanics software, the elastic stresses around wellbore are used in the mudweight calculation. However, such an approach neglects buildup and diffusion of pore pressure. In this disclosure, the poroelasticity properties of both the matrix and the natural fractures are taken into account to calculate the overall shear and bulk moduli as discussed previously. Furthermore, the obtained shear and bulk moduli are used with the Hoek-Brown criterion to calculate the safe mudweight window. Compared to other failure criteria, such as Mohr-Coulomb, Drucker-Prager, and modified Lade, using the Hoek-Brown criterion failure criterion to evaluate the shear failure can have one or more advantages. This approach considers the natural fractures' size, distribution, and density on the shear strength of naturally fractured rocks. On one hand, if the mudweight is too low, wellbore collapse might occur. On the other hand, if the mudweight is too high, wellbore fracturing might occur. Therefore, the safe drilling mudweight window is obtained based on difference between the critical collapse and fracturing mudweights. These calculations are related to rock strength simulated by such failure criteria and the computation of the effective stresses around the wellbore.

As discussed previously, the Hoek-Brown failure criterion can be used to evaluate the shear failure of the naturally fractured Maastrichtian shale. The Hoek-Brown failure criterion can be expressed as:

$$\sigma'_1 = \sigma'_3 + \sigma_{ci}\left(m_b\frac{\sigma'_3}{\sigma_{ci}} + s\right)^a \quad (11)$$

where $\sigma_{ci}$ is the uniaxial compressive strength of the intact rock; s and a are model parameters that are related to the geometry and surface conditions of fractures; $m_b$ is a parameter that represents the fracture properties and the mineralogy and grain size of the rock matrix, $\sigma'_1$ ($=\sigma_1-p$) and $\sigma'_3$ ($=\sigma_3-p$) are the effective normal stresses in the $x_i$ and $x_3$ directions, respectively.

In some cases, the material constants $\sigma_{ci}$, $m_b$, s, and a can be estimated from Geological Strength Index (GSI) and rock damage (D). GSI is determined based on rock structure and block surface conditions. The rock damage (D) is a factor depending on the disturbance degree that rock mass has experienced. The following equations can be used in an example estimation of these constants:

$$m_b = m_i e^{\frac{GSI-100}{28-14D}} \quad (12)$$

$$s = e^{\frac{GSI-100}{9-3D}} \quad (13)$$

$$a = \frac{1}{2} + \frac{1}{6}\left(e^{-\frac{GSI}{15}} - e^{-\frac{20}{3}}\right) \quad (14)$$

Where $m_i$ is a parameter determined based on intact rock properties, including mineralogy and grain size.

Figure 8:
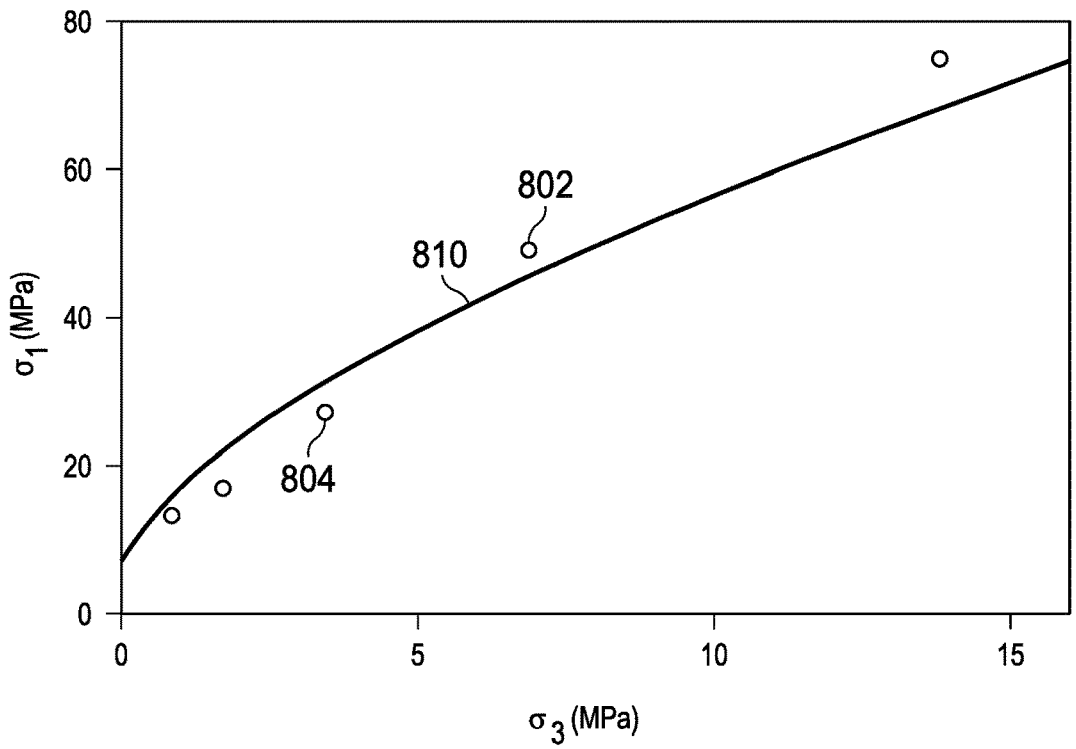
FIG. 8 illustrates an example of a chart showing an example curve fitting based on the Hoek-Brown failure criterion, according to an implementation.

In some cases, tri-axial tests can be performed to obtain empirical measurement data of the failure strength ($\sigma'_1$) and the confining stress ($\sigma'_3$). Accordingly, a curve fitting operation based on the Hoek-Brown failure criterion equations (11) can be performed to obtain the parameters $\sigma_{ci}$ and $m_b$. FIG. 8 and associated descriptions provide additional details of these implementations.

In one example, a set of field data for inclined offshore wellbore drilled in an offshore reservoir is analyzed using wellbore software platforms TECHLOG 2016.2 and SAGE-WSA that are integrated with the wellbore stability tool discussed previously to analyze wellbore stability. For this example, the water depth is 7846 feet (ft) and the hydraulic pressure gradient for the water depth is 0.447 pounds per square inch(psi)/ft. The profiles of wellbore trajectory, stresses, pore pressure and rock properties along the measured depth (MD) are shown in the following table:

| MD (ft) | Incl (degree (deg.)) | Azimuth (deg.) | SV (psi) | SH (psi) | Sh (psi) | Pp (psi) | AziSH (deg.) | Cohesion (psi) | E (Mpsi) |
|---|---|---|---|---|---|---|---|---|---|
| 9879.44 | 19.43 | 97.76 | 4944.49 | 4897.95 | 4805.03 | 4658.26 | 47.08 | 148.23 | 0.047 |
| 11857.45 | 58.15 | 88.21 | 6265.33 | 6179.05 | 5996.73 | 5482.18 | 44.86 | 249.96 | 0.08 |
| 13838.80 | 74.36 | 85.74 | 6804.85 | 6736.24 | 6511.01 | 5814.19 | 43.77 | 293.35 | 0.094 |
| 15869.78 | 74.36 | 85.74 | 7279.40 | 7193.49 | 6951.03 | 6092.90 | 43.27 | 292.23 | 0.094 |
| 17825.66 | 74.37 | 85.74 | 7761.41 | 7599.02 | 7289.28 | 6364.58 | 42.51 | 355.20 | 0.114 |
| 19862.41 | 76.49 | 78.92 | 8240.35 | 8051.55 | 7717.21 | 6643.93 | 42.94 | 558.98 | 0.179 |

Figure 4:
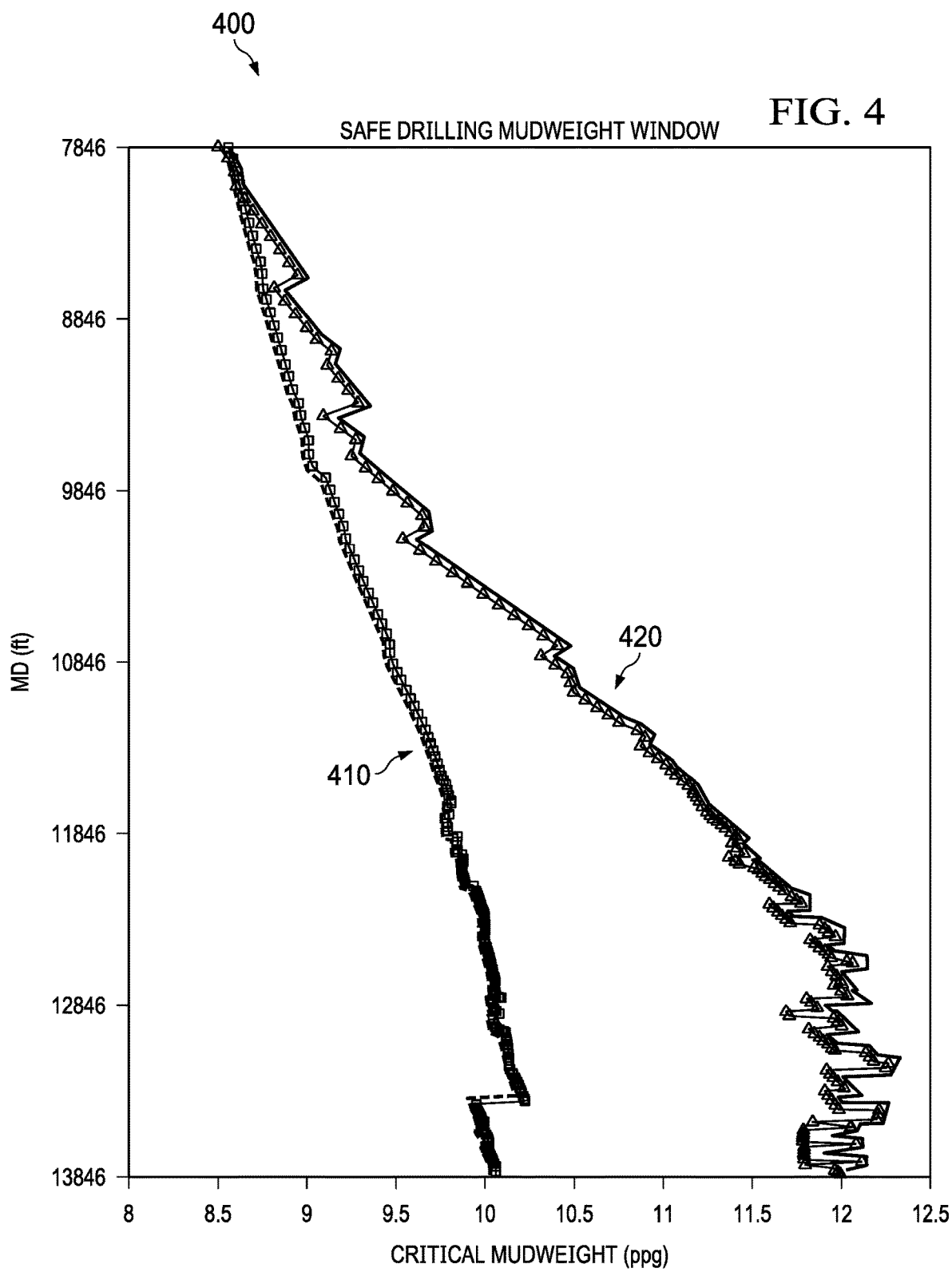
FIG. 4 illustrates an example of a chart that shows a safe mudweight window, according to an implementation.

FIG. 4 illustrates an example of a chart 400 that shows a safe mudweight window, according to an implementation. The chart 400 is obtained using the wellbore stability tool and algorithms discussed previously, in combination with the wellbore software platform TECHLOG. The wellbore stability tool produces similar results when integrated with a different aeromechanics software platform SAGE-WSA. As illustrated, the chart 400 includes a curve 410 and a curve 420. The curve 410 represents the critical collapse mudweight (CMW) as the lower bound. The curve 420 represents the fracturing mudweight (FMW) as the upper bound. Accordingly, at each depth (represented by the y-axis), the safe mudweight window, representing the mudweight that would maintain the wellbore stability, is between the values of the CMW and FMW, at corresponding depth.

Figure 5:
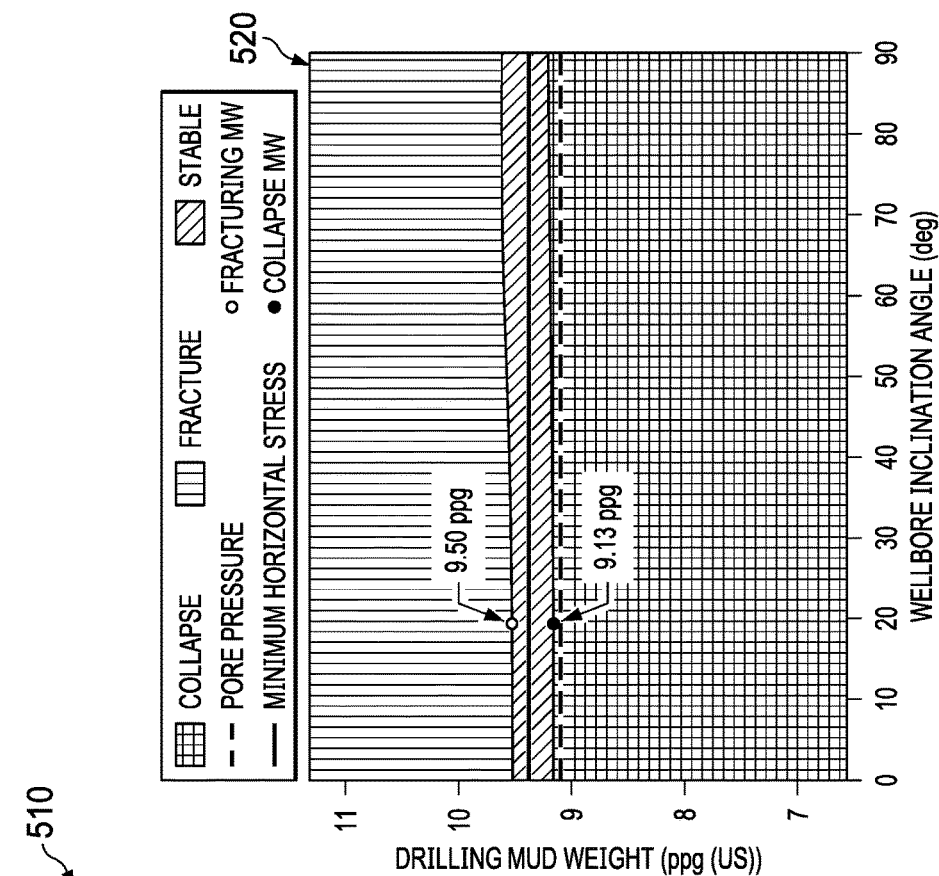
FIG. 5 illustrates example outputs of the wellbore stability tool, according to an implementation.
Figure 5:
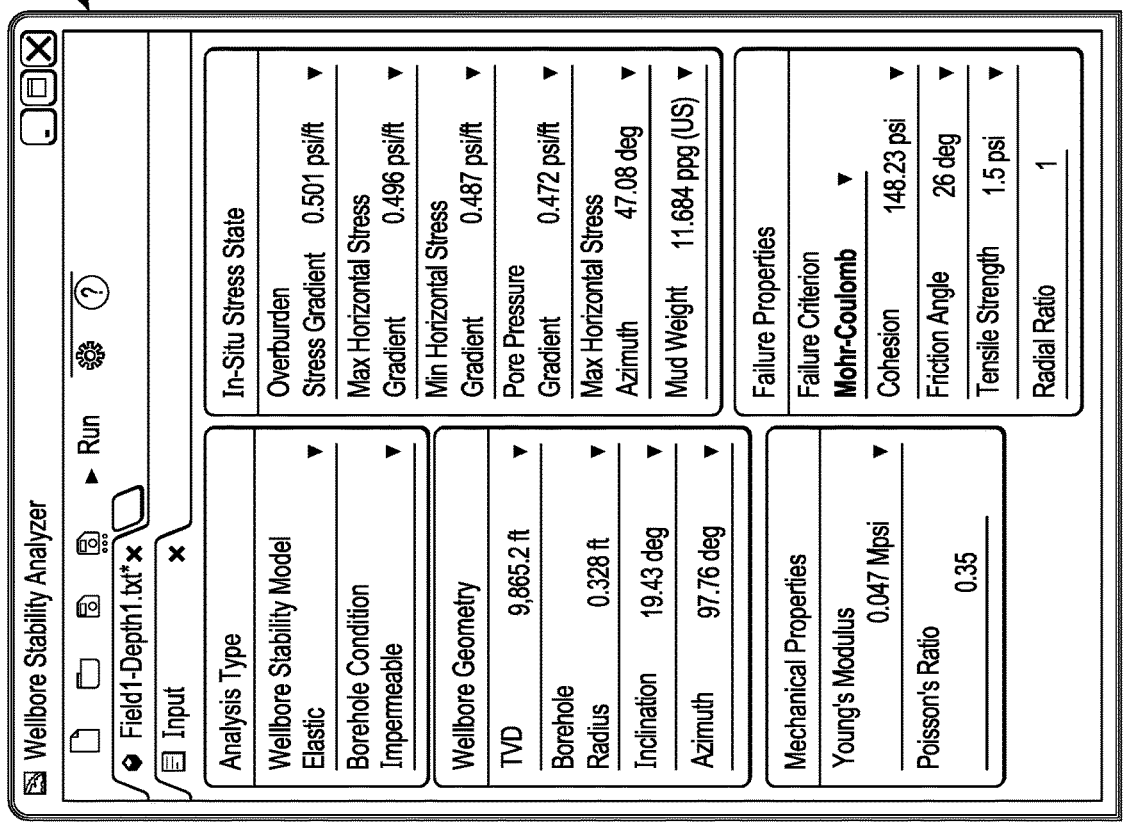

FIG. 5 illustrates example outputs of the wellbore stability tool, according to an implementation. FIG. 5 includes an example GUI 510 that shows input data used for this example. FIG. 5 also includes a chart 520 showing the safe mudweight window at different wellbore incline angle. For example, at an incline angle at about 20 degree, the safe mudweight window is between 9.13 pounds per gallon (ppg) and 9.50 ppg.

In another example, a field case in another reservoir is analyzed. In this case, an inclined wellbore with an inclination angle of 24 degree (°) and azimuth of 295° was drilled through a Cretaceous Shale. At the measured depth of 2750 m and interval from 2750 m and 3000 m, wellbore instability was experienced with a drilling mudweight of 9.2 pound/gallon (lb/gal). The hole enlargement was up to 40 inch (in.) A sidetrack wellbore was successfully drilled using a mudweight of 11.7 lb/gal. Compared to the original wellbore, the stability of the sidetrack was improved. Oil-based drilling mud was used in both the original and the sidetrack wellbores. No lost circulation materials (LCM) were added to the mud. Shale rock samples at the troublesome depth extracted from the sidetrack wellbore were observed to be fractured. The in-situ stresses and pore pressure gradients, wellbore trajectory and geometry, mechanical and hydraulic properties of the rock matrix and fracture are listed in the following table:

| In-situ Stresses and Pore Pressure | |
|---|---|
| Vertical stress gradient, dSv (kPa/m) | 22.6 |
| Maximum horizontal stress gradient, $dS_H$ (kPa/m) | 18.1 |
| Minimum horizontal stress gradient, $dS_h$ (kPa/m) | 18.1 |
| Pore pressure gradient, $dP_p$ (kPa/m) | 10.0 |
| Maximum horizontal stress azimuth, $\varphi_{x'}$ (degree) | 0 |

| Wellbore Trajectory and Geometry | |
|---|---|
| Inclination, $\varphi_z$ (degree) | 24 |
| Azimuth, $\varphi_x$ (degree) | 295 |
| Wellbore radius, R (m) | 0.1 |
| True vertical depth, TVD (m) | 2900 |

| Mechanical and Hydraulic Properties of Matrix and Fracture | | |
|---|---|---|
| Parameters | Matrix | Fracture |
| Young's modulus, E (GPa) | 2 | 0.02 |
| Poisson's ratio, ν | 0.22 | 0.22 |
| Biot's coefficient, α | 1 | 1 |
| Skempton's coefficient, B | 0.92 | 0.99 |
| Permeability, k (mD) | $5.0 \times 10^{-5}$ | $2.0 \times 10^{-2}$ |
| Viscosity, μ (Pa · s) | 0.001 | 0.001 |
| Volume fraction, v (%) | 95 | 5 |
| Membrane coefficient, χ | 0 | 0 |
| Cation exchange capacity, CEC (meq/100 g) | 0 | 0 |
| Cation diffusion coefficient, $D^c$, (m²/s) | 0 | |
| Anion diffusion coefficient, $D^a$, (m²/s) | 0 | |
| Electro-Osmotic permeability, $\kappa_{eo}$ (m²/V/s) | 0 | |
| Electrical conductivity, $\kappa_e$ (S/m) | 0 | |

Shale chemical activity can be inhibited and reduced by an oil-based drilling mud. Thus, the chemical effects were not included, and the drilling mud salinity was set as the same as the formation pore fluid salinity and chemoelectrical parameters, including, for example, shale membrane coefficient, cation exchange capacity, ion diffusion coefficient, electro-osmotic permeability, and electrical conductivity, to zeros. Correspondingly, the dual-porochemoelectro-elastic wellbore approach is reduced to the dual-porosity poroelastic approach.

Figure 6:
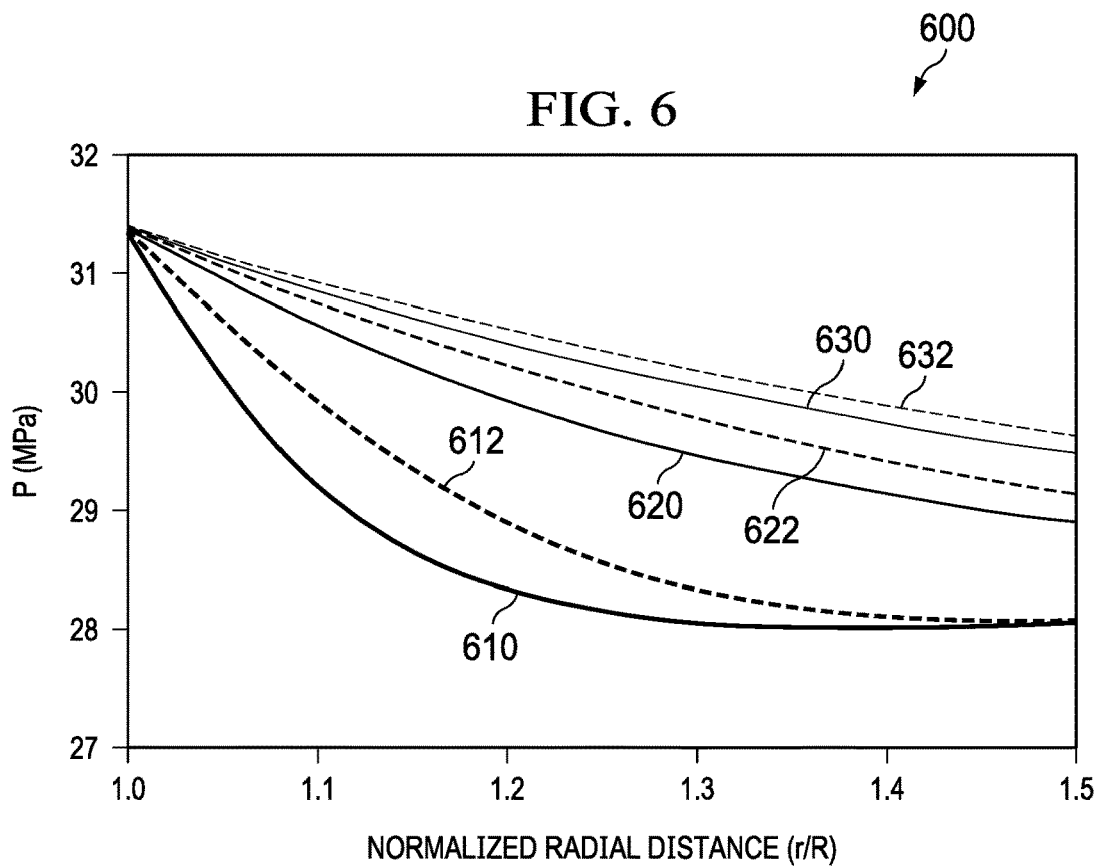
FIG. 6 illustrates an example of a chart showing an evolution of pore pressure distribution, according to an implementation

At the wellbore wall, both matrix and fracture pore pressures are set equal to the drilling mud pressure ($p_w$=31.4 MPa). FIG. 6 illustrates an example of a chart 600 showing an evolution of pore pressure distribution, according to an implementation. The x-axis represents the normalized radial distance and the y-axis represents the pore pressure. Curves 610, 620, and 630 represent the pore pressure for the rock matrix in 10 minutes, 1 hour, and 2 hours, respectively. Curves 612, 622, and 632 represent the pore pressure for the natural fractures in 10 minutes, 1 hour, and 2 hours, respectively. As illustrated, the hydraulic diffusion rate in natural fractures is greater than that in rock matrix because permeability is greater in the natural fractures.

Figure 7:
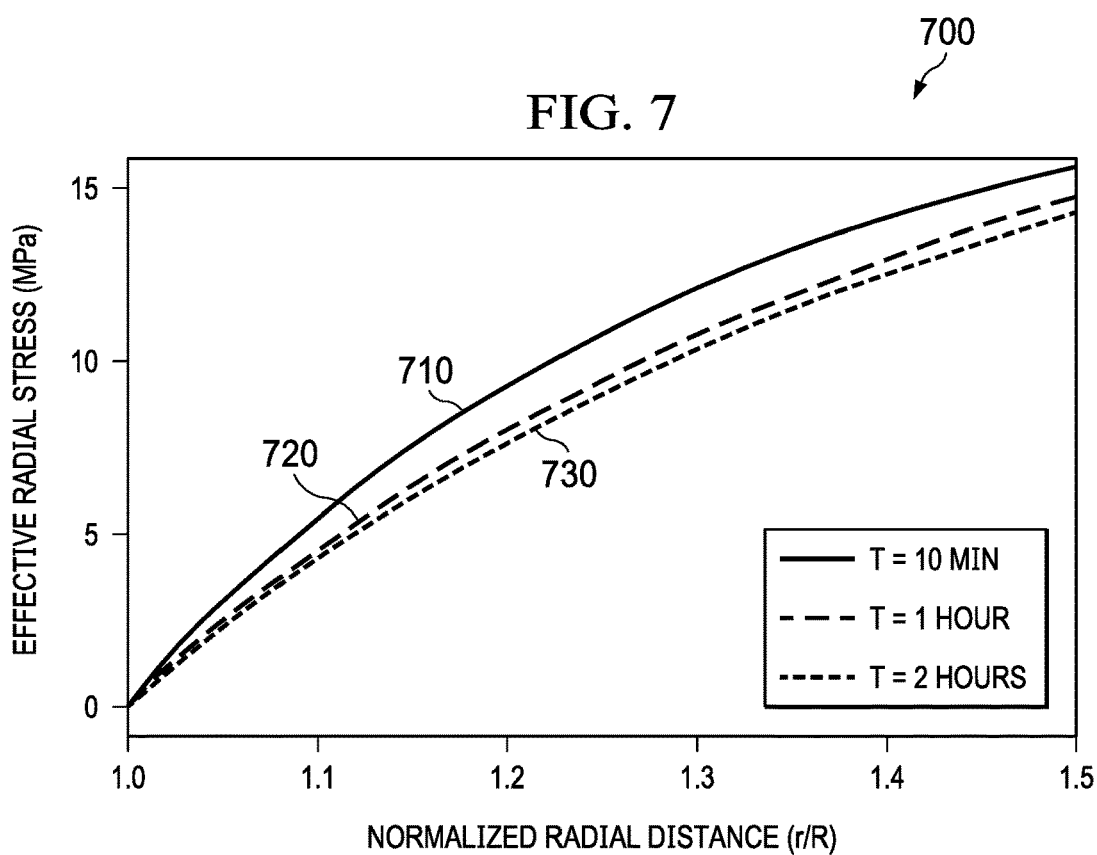
FIG. 7 illustrates an example of a chart showing an evolution of effective radial stress distribution, according to an implementation.

FIG. 7 illustrates an example of a chart 700 showing an evolution of effective radial stress distribution, according to an implementation. The x-axis represents the normalized radial distance and the y-axis represents the effective radial stress. Curves 710, 720, and 730 represent the effective radial stress on the wellbore wall in 10 minutes, 1 hour, and 2 hours, respectively. Since shale chemical activity was inhibited by the oil-based drilling mud, no tensile stress was generated around the wellbore.

Figure 9:
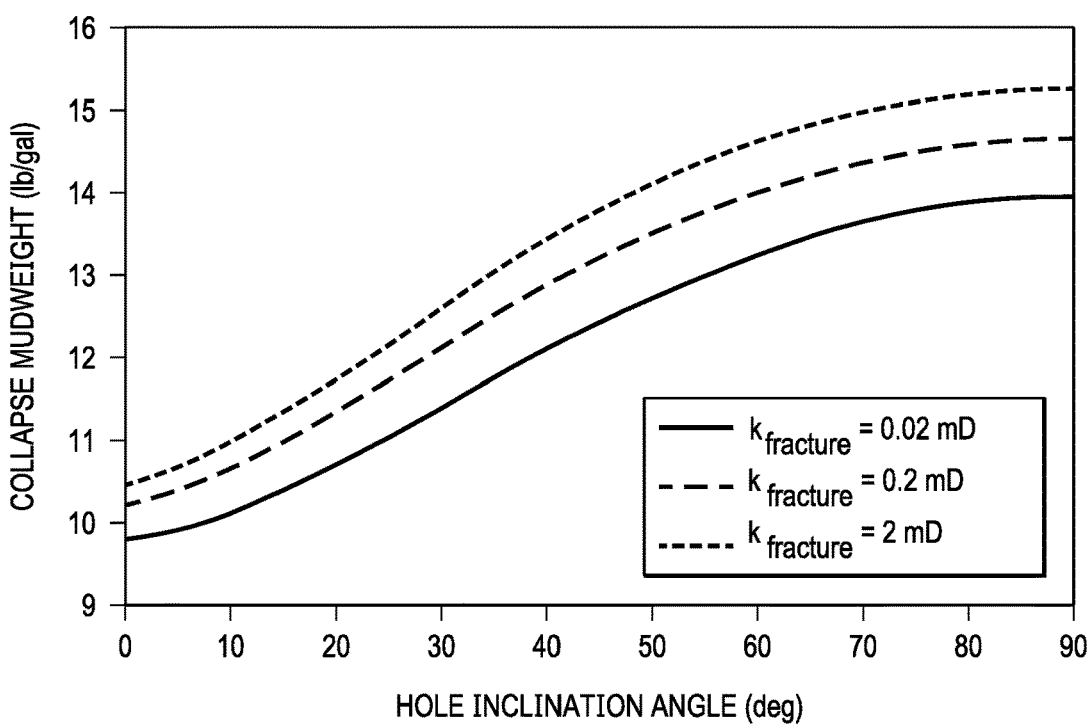
FIG. 9 illustrates an example of a chart showing effects of fracture permeability on the collapse mudweights, according to an implementation.

FIG. 8 illustrates an example of a chart 800 showing an example curve fitting based on the Hoek-Brown failure criterion, according to an implementation. The chart 800 includes points 802, 804, and other points. The y-axis of each point represents the failure strength ($\sigma'_1$), and the x-axis of each point represents the confining stress ($\sigma'_3$). These points are obtained from tri-axial tests on rock examples collected from the field. The chart 800 also includes a curve 810. The curve 810 is obtained by using curve fitting algorithms to find a curve that matches these points with the Hoek-Brown failure criterion discussed previously in equations (11-14). Using the data points (for example 802, 804 and others) and values s=0.05, and a=0.5, the curve 810 can be obtained and the following values of $\sigma_{ci}$ and $m_b$ can be determined: $\sigma_{ci}$=31.0 MPa, $m_b$=7.0, FIG. 9 illustrates an example of a chart 900 showing effects of fracture permeability on the collapse mudweights, according to an implementation. For the inclined wellbore with 24 degrees, as fracture permeability varies from 0.02 millidarcy (mD) to 0.2 mD, the collapse mudweight increases from 11.0 pounds/gallon (lb/gal) to 11.7 lb/gal (around 6.4% increase). Field operation data reported that this wellbore was unstable when a mudweight of 9.2 lb/gal was used. In the sidetrack, the wellbore was stabilized where the drilling mudweight was raised to 11.7 lb/gal. Performing sensitivity analysis on fracture permeability to match the actual used drilling mudweight indicates that the fracture permeability is approximately 0.02 mD. As such, the drilling mudweight at 11.7 lb/gal was greater than the collapse mudweight shown in FIG. 9, and thus was able to maintain the stability of the wellbore.

Therefore, the wellbore stability tool can be used to output the safe mudweight window. The safe mudweight window can be used to select mudweight that can be used to maintain wellbore stability. Accordingly, drilling fluid with the selected mudweight is injected into the well during drilling and other field operations. In some cases, some of these procedures can be automated, for example, the safe mudweight window can be sent to the drilling system in the field for mud tank or other drilling equipment to select and compose drilling fluid accordingly.

Figure 10:
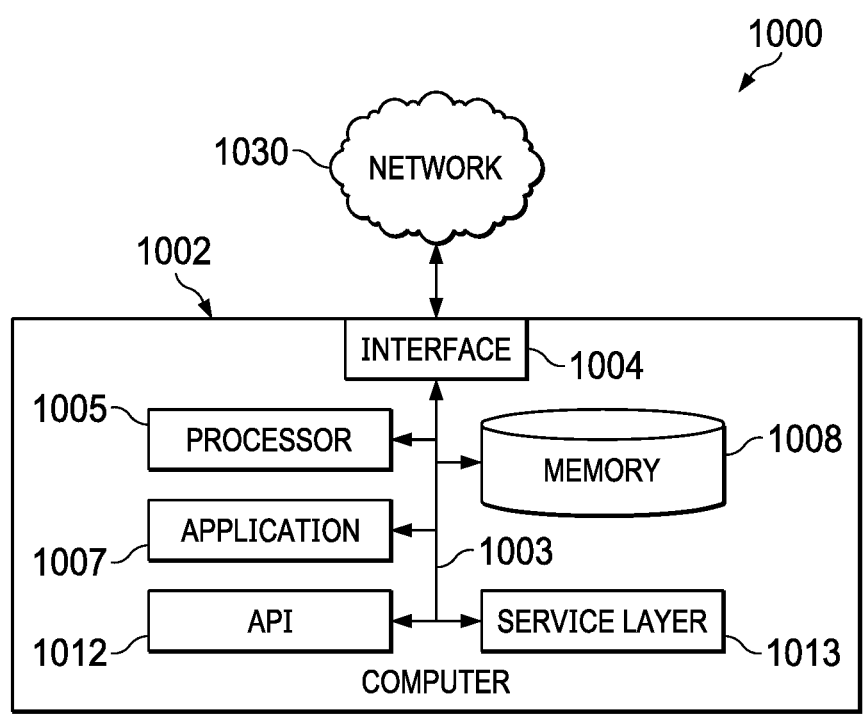
FIG. 10 is a high level architecture block diagram of a wellbore stability analysis system, according to an implementation.

FIG. 10 is a high-level architecture block diagram of a wellbore stability analysis system 1000 based on the methods described in this disclosure, according to an implementation. At a high level, the illustrated system 1000 includes a computer 1002 coupled with a network 1030.

The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 1030 facilitates communication between the computer 1002 and other components, for example, components that obtain observed data for a location and transmit the observed data to the computer 1002. The network 1030 can be a wireless or a wireline network. The network 1030 can also be a memory pipe, a hardware connection, or any internal or external communication paths between the components.

The computer 1002 includes a computing system configured to perform the method as described in this disclosure. In some cases, the method can be implemented in an executable computing code, for example, C/C++ executable codes. In some cases, the computer 1002 can include a standalone LINUX system that runs batch applications. In some cases, the computer 1002 can include mobile or personal computers.

The computer 1002 may comprise a computer that includes an input device, such as a keypad, keyboard, touch screen, microphone, speech recognition device, other devices that can accept user information, or an output device that conveys information associated with the operation of the computer 1002, including digital data, visual or audio information, or a graphic user interface (GUI).

The computer 1002 can serve as a client, network component, a server, a database, or other persistency, or any other component of the system 1000. In some implementations, one or more components of the computer 1002 may be configured to operate within a cloud-computing-based environment.

At a high level, the computer 1002 is an electronic computing device operable to receive, transmit, process, store, or manage data and information associated with the system 1000. According to some implementations, the computer 1002 may also include, or be communicably coupled with, an application server, e-mail server, web server, caching server, streaming data server, business intelligence (BI) server, or other server.

The computer 1002 can receive requests over network 1030 from a client application (for example, executing on another computer 1002) and respond to the received requests by processing said requests in an appropriate software application. In addition, requests may also be sent to the computer 1002 from internal users (for example, from a command console), external or third parties, or other automated applications.

Each of the components of the computer 1002 can communicate using a system bus 1003. In some implementations, any or all the components of the computer 1002, both hardware or software, may interface with each other or the interface 1004, over the system bus 1003, using an application programming interface (API) 1012 or a service layer 1013. The API 1012 may include specifications for routines, data structures, and object classes. The API 1012 may be either computer language-independent or -dependent and refer to a complete interface, a single function, or even a set of APIs. The service layer 1013 provides software services to the computer 1002 or the system 1000. The functionality of the computer 1002 may be accessible for all service consumers using this service layer. Software services, such as those provided by the service layer 1013, provide reusable, defined business functionalities, through a defined interface. For example, the interface may be software written in JAVA, C++, or suitable language providing data in Extensible Markup Language (XML) format. While illustrated as an integrated component of the computer 1002, alternative implementations may illustrate the API 1012 or the service layer 1013 as stand-alone components in relation to other components of the computer 1002 or the system 1000. Moreover, any or all parts of the API 1012 or the service layer 1013 may be implemented as sub-modules of another software module, enterprise application, or hardware module, without departing from the scope of this disclosure.

The computer 1002 includes an interface 1004. Although illustrated as a single interface 1004 in FIG. 10, two or more interfaces 1004 may be used according to particular needs, desires, or particular implementations of the computer 1002 or system 1000. The interface 1004 is used by the computer 1002 for communicating with other systems in a distributed environment—including within the system 1000—connected to the network 1030 (whether illustrated or not). Generally, the interface 1004 comprises logic encoded in software or hardware in a suitable combination and operable to communicate with the network 1030. More specifically, the interface 1004 may comprise software supporting one or more communication protocols associated with communications such that the network 1030 or interface's hardware is operable to communicate physical signals within and outside of the illustrated system 1000.

The computer 1002 includes a processor 1005. Although illustrated as a single processor 1005 in FIG. 10, two or more processors may be used according to particular needs, desires, or particular implementations of the computer 1002 or the system 1000. Generally, the processor 1005 executes instructions and manipulates data to perform the operations of the computer 1002. Specifically, the processor 1005 executes the functionality required for processing geophysical data.

The computer 1002 also includes a memory 1008 that holds data for the computer 1002 or other components of the system 1000. Although illustrated as a single memory 1008 in FIG. 10, two or more memories may be used according to particular needs, desires, or particular implementations of the computer 1002 or the system 1000. While memory 1008 is illustrated as an integral component of the computer 1002, in alternative implementations, memory 1008 can be external to the computer 1002 or the system 1000.

The application 1007 is a software engine providing functionality according to particular needs, desires, or particular implementations of the computer 1002 or the system 1000, particularly with respect to functionality required for processing geophysical data. For example, application 1007 can serve as one or more components or applications described in FIGS. 1-9. Further, although illustrated as a single application 1007, the application 1007 may be implemented as multiple applications 1007, on the computer 1002. In addition, although illustrated as integral to the computer 1002, in alternative implementations, the application 1007 can be external to the computer 1002 or the system 1000.

There may be any number of computers 1002 associated with, or external to, the system 1000 and communicating over network 1030. Further, the terms "client," "user," and other appropriate terminology may be used interchangeably, as appropriate, without departing from the scope of this disclosure. Moreover, this disclosure contemplates that many users may use one computer 1002, or that one user may use multiple computers 1002.

In some implementations, the described methodology can be configured to send messages, instructions, or other communications to a computer-implemented controller, database, or other computer-implemented system to dynamically initiate control of, control, or cause another computer-implemented system to perform a computer-implemented operation. For example, operations based on data, operations, outputs, or interaction with a GUI can be transmitted to cause operations associated with a computer, database, network, or other computer-based system to perform storage efficiency, data retrieval, or other operations consistent with this disclosure. In another example, interacting with any illustrated GUI can automatically result in one or more instructions transmitted from the GUI to trigger requests for data, storage of data, analysis of data, or other operations consistent with this disclosure.

In some instances, transmitted instructions can result in control, operation, modification, enhancement, or other operations with respect to a tangible, real-world piece of computing or other equipment. For example, the described GUIs can send a request to slow or speed up a computer database magnetic/optical disk drive, activate/deactivate a computing system, cause a network interface device to disable, throttle, or increase data bandwidth allowed across a network connection, or sound an audible/visual alarm (such as, a mechanical alarm/light emitting device) as a notification of a result, behavior, determination, or analysis with respect to a computing system(s) associated with the described methodology or interacting with the computing system(s) associated with the described methodology.

In some implementations, the output of the described methodology can be used to dynamically influence, direct, control, influence, or manage tangible, real-world equipment related to hydrocarbon production, analysis, and recovery or for other purposes consistent with this disclosure. For example, data relating to processed seismic data can be used to enhance quality of produced seismic/structural images or for use in other analytical/predictive processes. As another example, the data relating to processed seismic data can be used to modify a wellbore trajectory, increase/decrease speed of or stop/start a hydrocarbon drill; activate/deactivate an alarm (such as, a visual, auditory, or voice alarm), select/compose drilling fluids, or to affect refinery or pumping operations (for example, stop, restart, accelerate, or reduce). Other examples can include alerting geo-steering and directional drilling staff when underground obstacles have been detected (such as, with a visual, auditory, or voice alarm). In some implementations, the described methodology can be integrated as part of a dynamic computer-implemented control system to control, influence, or use with any hydrocarbon-related or other tangible, real-world equipment consistent with this disclosure.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), a FPGA (field programmable gate array), or an ASIC (application-specific integrated circuit). In some implementations, the data processing apparatus or special purpose logic circuitry may be hardware-based or software-based. The apparatus can optionally include code that creates an execution environment for computer programs, for example, code that constitutes processor firmware, a protocol stack, a database management system, an operating system, or a combination of one or more of them. The present disclosure contemplates the use of data processing apparatuses with or without conventional operating systems, for example, LINUX, UNIX, WINDOWS, MAC OS, ANDROID, or IOS.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, or libraries. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business or dynamic information, and any other appropriate information including any parameters, variables, algorithms, instructions, rules, constraints, or references. Additionally, the memory may include any other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity or a multi-touch screen using capacitive or electric sensing. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication, for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20, and all or a portion of the Internet. The network may communicate with, for example, Internet Protocol (IP) packets, Frame Relay frames, Asynchronous Transfer Mode (ATM) cells, voice, video, data, or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software, may interface with each other or the interface using an application programming interface (API) or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API or service layer may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any disclosure or on the scope of what may be claimed, but rather as descriptions of features that may be specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation or integration of various system modules and components in the implementations described previously should not be understood as requiring such separation or integration in all implementations, and it should be understood that the described program components and systems can generally be integrated together in a single software product or packaged into multiple software products.

Accordingly, the previous description of example implementations does not define or constrain this disclosure. Other changes, substitutions, and alterations are also possible without departing from the spirit and scope of this disclosure.

What is claimed is:

1. A computer-implemented method for determining a mudweight of drilling fluids in a hydrocarbon reservoir, comprising:
   receiving, by a hardware processor, pore pressure data of a rock formation in the hydrocarbon reservoir;
   determining, by the hardware processor, permeability data of fractures of the hydrocarbon reservoir;
   determining, by the hardware processor, Hoek-Brown failure criterion data; and
   determining, by the hardware processor, a safe mudweight window based on the pore pressure data of the rock formation, the permeability data of the fractures, and the Hoek-Brown failure criterion data.

2. The method of claim 1, wherein the safe drilling mudweight window represents a difference between a critical collapse mudweight and a fracturing mudweight.

3. The method of claim 1, wherein the safe mudweight window is determined further based on well trajectory data of the rock formation.

4. The method of claim 1, wherein the safe mudweight window is determined further based on elastic properties data of the rock formation.

5. The method of claim 1, wherein the Hoek-Brown failure criterion data is calculated based on a Geological Strength Index (GSI) and a disturbance factor of the rock formation.

6. The method of claim 1, wherein the Hoek-Brown failure criterion data is obtained based on empirical measurement data of a failure strength parameter and the confining stress parameter.

7. The method of claim 1, further comprising: displaying information of the safe mudweight window at different wellbore inclination angles.

8. A non-transitory computer-readable medium storing instructions which, when executed, cause a computer to perform operations comprising:
   receiving, by a hardware processor, pore pressure data of a rock formation in a hydrocarbon reservoir;
   determining, by the hardware processor, permeability data of fractures of the hydrocarbon reservoir;
   determining, by the hardware processor, Hoek-Brown failure criterion data; and
   determining, by the hardware processor, a safe mudweight window based on the pore pressure data of the rock formation, the permeability data of the fractures, and the Hoek-Brown failure criterion data.

9. The non-transitory computer-readable medium of claim 8, wherein the safe drilling mudweight window represents a difference between a critical collapse mudweight and a fracturing mudweight.

10. The non-transitory computer-readable medium of claim 8, wherein the safe mudweight window is determined further based on well trajectory data of the rock formation.

11. The non-transitory computer-readable medium of claim 8, wherein the safe mudweight window is determined further based on elastic properties data of the rock formation.

12. The non-transitory computer-readable medium of claim 8, wherein the Hoek-Brown failure criterion data is calculated based on a Geological Strength Index (GSI) and a disturbance factor of the rock formation.

13. The non-transitory computer-readable medium of claim 8, wherein the Hoek-Brown failure criterion data is obtained based on empirical measurement data of a failure strength parameter and the confining stress parameter.

14. The non-transitory computer-readable medium of claim 8, the operations further comprising: displaying information of the safe mudweight window at different wellbore inclination angles.

15. A device, comprising:
   at least one hardware processor; and
   a non-transitory computer-readable storage medium coupled to the at least one hardware processor and storing programming instructions for execution by the at least one hardware processor, wherein the programming instructions, when executed, cause the at least one hardware processor to perform operations comprising:
      receiving pore pressure data of a rock formation in a hydrocarbon reservoir;
      determining permeability data of fractures of the hydrocarbon reservoir;
      determining Hoek-Brown failure criterion data; and
      determining a safe mudweight window based on the pore pressure data of the rock formation, the permeability data of the fractures, and the Hoek-Brown failure criterion data.

16. The device of claim 15, wherein the safe drilling mudweight window represents a difference between a critical collapse mudweight and a fracturing mudweight.

17. The device of claim 15, wherein the safe mudweight window is determined further based on well trajectory data of the rock formation.

18. The device of claim 15, wherein the safe mudweight window is determined further based on elastic properties data of the rock formation.

19. The device of claim 15, wherein the Hoek-Brown failure criterion data is calculated based on a Geological Strength Index (GSI) and a disturbance factor of the rock formation.

20. The device of claim 15, wherein the Hoek-Brown failure criterion data is obtained based on empirical measurement data of a failure strength parameter and the confining stress parameter.

* * * * *